Dec. 22, 1931.   A. B. SAURMAN ET AL   1,837,375
TERMINAL STRUCTURE
Filed Sept. 30, 1925
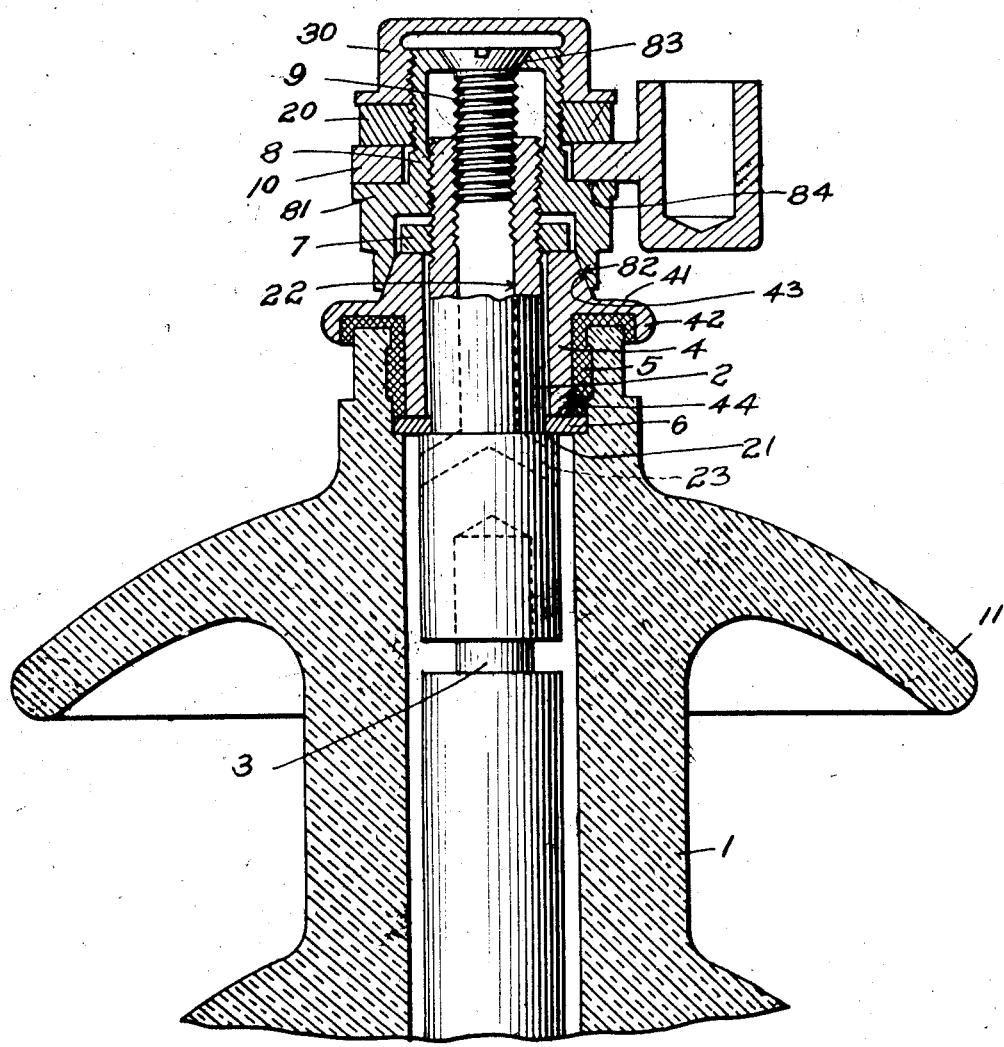
WITNESSES
INVENTORS
Attee B. Saurman
John B. Webb
by Christy and Christy
their attorneys Patented Dec. 22, 1931

1,837,375

UNITED STATES PATENT OFFICE

ATLEE B. SAURMAN, OF PITTSBURGH, AND JOHN B. WEBB, OF WILKINSBURG, PENN-SYLVANIA, ASSIGNORS, BY MESNE ASSIGNMENTS, TO GENERAL CABLE CORPORATION, A CORPORATION OF NEW JERSEY

TERMINAL STRUCTURE

Application filed September 30, 1925. Serial No. 59,557.

Our invention relates to improvements in terminal structures; that is to say structures within which and by means of which an adequate and properly insulated union is effected between an insulated cable, such for example as may be laid under ground, and a bare aerial conductor. The invention centers in the lead-out, through which continuity of the conducting element is maintained through an opening in the wall of the terminal casing to the aerial line. In Letters Patent of the United States No. 1,159,655, granted November 9, 1915, on the application of C. W. Davis, a terminal structure is shown, and it is upon such a structure that our invention constitutes an improvement.

The accompanying drawing is a view in vertical and medial section of the upper part of a lead-out structure which forms part of a terminal of the sort we have indicated and of a sort whose organization and arrangement are well known. And in the lead-out structure here illustrated our invention is found.

The lead-out structure consists of a sleeve 1 of insulating material, exteriorly petticoated, as at 11, and of a conducting stem 2, extending within the sleeve and secured in place therein. The stem 2 is at its inner end socketed, to receive and to be brought into electrical union with the introduced end 3 of a cable conductor; it is shouldered externally as at 21; it is provided with a bore 22 which extends from its outer end inward, and which may be continued in a duct or ducts 23 leading through the body of the stem and opening through its outer surface, at a point inward from the external shoulder. The stem at its outer end is screw-threaded, both externally and internally, at the mouth of bore 22, and, for purposes presently to be described, the threads are unlike in pitch.

On the outer end of sleeve 1 a ring 4 of conducting material, preferably of copper, is secured. This ring is provided with an outstanding flange 41, having a depending rim 42, which when the ring is applied, overlies and encloses the upper end of the sleeve. The ring is anchored in place by a body of cement, indicated at 5. Interiorly the ring is somewhat smaller in diameter than the bore through sleeve 1, and when the ring is secured in place in the sleeve its inner end constitutes a shoulder 44 in the bore of the assembled structure against which, with a body of packing 6 between, the shoulder 21 of stem 2 may abut. A clamping nut 7 screwed on the threaded outer end of stem 2 may effect clamping of the stem 2 in place within sleeve 1, in the position shown in the drawing.

Externally, and beyond flange 41, ring 4 is provided with a conical surface 43, tapering outwardly, as shown.

A cap nut 8 of conducting material, usually of brass, is screwed upon stem 2, beyond clamping nut 7. This cap nut is provided with an outstanding flange 81 having a depending rim, and the inner face 82 of the rim is conical and affords a counter part to the outer conical face 43 of ring 4. It will be perceived that when cap nut 8 is screwed home there is a wedging engagement of surface 82 upon surface 43. Since the engaging bodies are bodies of like metal, ordinarily copper and brass, an efficient, weather-tight joint is effected, in which no gasket is needed; a joint, therefore, which is relatively durable, and for all practical purposes, permanent against deterioration.

The cap nut 8 is provided with an axial opening 83 which affords a seat for the head of a screw 9. This screw 9 engages the thread in the bore 22 of stem 2, and when applied, as shown in the drawing, closes the cap nut. By virtue of the fact that the pitch of the threaded union of screw 9 to stem 2 is different from that of the union of cap nut 8 to stem 2, the screw 9 when in place, constitutes a lock, resisting strains upon the cap nut 8, tending to loosen it, and so holding the surfaces 82 and 43 in firm engagement.

The cap nut 8 at its outer end is externally screw threaded.

Cap nut 8, being screw threaded upon stem 2, and over surfaces which are wholly protected from the weather; is electrically continuous with stem 2. The outstanding flange 81 upon cap nut 8 affords a surface 84 upon which a ring 10 may, by a clamping nut 20, screwed upon the outer end of cap nut 8, be clamped, to afford electrical contact. The ring 10 may as the drawing shows carry a socket in which the end of an aerial line may be mechanically secured and electrically united.

Over all, a second cap nut 30 screwed upon the end of cap nut 8, may close the structure.

The advantages of the structure now particularly described are, first, the weather tight seam of metal upon metal between the wedge surfaces 82 and 43, which seals the mounting of stem 2 in sleeve 1; second, the lock which screw 9 affords, securing the parts so wedged together; third, such a union so placed that it remains undisturbed by the application of and the separation of the aerial; fourth, a locking means (the screw 9,—which also makes wedging engagement upon the surface 83 of the cap nut) which is not disturbed by the removal of cap nut 30 nor by the application of and removal of an aerial. The lead-out structure remains at all times secure; the bore within the structure at all times closed to the weather.

The bore 22 through the stem 2, being prolonged in the duct 23, as described, affords a filling opening for the terminal, through which insulating compound may be introduced, and screw 9 affords closure for such filling opening.

We claim as our invention:

1. A lead-out structure for a terminal, including a sleeve of insulating material, a metallic ring provided externally with a conical surface borne coaxially by said sleeve, a stem of conducting material secured in place in the bore of the sleeve and at its outer end provided with an axial bore and screw-threaded at its outer end, both exteriorly and interiorly, a cap nut of metal provided with an axial opening and with a flange having a depending rim with a conical inner face, adapted to be screwed upon the outer end of the stem and seated with its flange in wedging abutment upon the conical surface of said ring, and a locking screw adapted to be introduced through the axial opening of the cap nut and to engage the screw thread in the bore of the stem.

2. A lead-out structure for a terminal, including a sleeve of insulating material, a metallic ring provided externally with a conical surface borne coaxially by said sleeve, a stem of conducting material secured in place in the bore of the sleeve and at its outer end provided with an axial bore and screw-threaded at its outer end, both exteriorly and interiorly, a cap-nut of metal provided with an axial opening, screw-threaded exteriorly, and provided with a flange having a depending rim with conical inner face, such cap nut being adapted to be screwed upon the outer end of the stem and seated with its flange in wedging abutment upon the conical surrface of said ring, a locking screw adapted to be introduced through the axial opening of the cap nut and to engage the screw thread in the bore of the stem, a clamping nut applicable to the screw threaded exterior of said cap nut and adapted to clamp an anchoring ring for an aerial conductor in conducting union upon the flange of the cap nut, and a second cap nut applicable to the screw-threaded exterior of the cap nut first named.

3. A lead-out structure for a terminal, including a sleeve of insulating material, a metallic ring secured in coaxial position to said sleeve, a stem of conducting material secured in place in the bore of the sleeve and extending outwardly through said ring, said stem having a screw-threaded passageway extending from its outer end and opening to the interior of said sleeve, an apertured metallic cap secured to the outer end of said stem and in abutting relation to said metallic ring to form a fluid-tight joint between said metal cap-nut and said metallic ring, and a screw seated in the apertured cap and engaging the screw-threaded passageway in the said stem.

In testimony whereof we have hereunto set our hands.

ATLEE B. SAURMAN.
JOHN B. WEBB.